United States Patent
Vogt et al.

(10) Patent No.: US 12,286,357 B2
(45) Date of Patent: Apr. 29, 2025

(54) PROCESS OF OBTAINING POWDERED SODIUM SILICATE FROM SAND TAILINGS ORIGINATED FROM THE IRON ORE CONCENTRATION PROCESS

(71) Applicant: Vale S.A., Rio de Janeiro (BR)

(72) Inventors: Jordanna Chamon Vogt, Brumadinho (BR); Fernando Soares Lameiras, Nova Lima (BR)

(73) Assignee: VALE S.A., Rio de Janeiro (BR)

( * ) Notice: Subject to any disclaimer, the term of this patent is extended or adjusted under 35 U.S.C. 154(b) by 757 days.

(21) Appl. No.: 17/630,436

(22) PCT Filed: Jul. 15, 2020

(86) PCT No.: PCT/BR2020/050261
§ 371 (c)(1),
(2) Date: Jan. 26, 2022

(87) PCT Pub. No.: WO2021/035318
PCT Pub. Date: Mar. 4, 2021

(65) Prior Publication Data
US 2022/0250923 A1    Aug. 11, 2022

(30) Foreign Application Priority Data
Aug. 30, 2019 (BR) .................. BR102019018080-3

(51) Int. Cl.
*C01B 33/32* (2006.01)
*B09B 3/80* (2022.01)

(52) U.S. Cl.
CPC ............ *C01B 33/32* (2013.01); *B09B 3/80* (2022.01); *C01B 33/325* (2013.01); *C01P 2004/61* (2013.01)

(58) Field of Classification Search
CPC ........................ C01B 33/325; C01B 33/32
See application file for complete search history.

(56) References Cited

FOREIGN PATENT DOCUMENTS

| | | | |
|---|---|---|---|
| BR | PI0101413 A2 | 3/2001 | |
| CN | 102583417 | 7/2012 | |
| CN | 105502426 * | 4/2016 | ............ C01B 33/32 |
| CN | 108726525 A | 11/2018 | |
| RU | 2335456 C1 | 10/2008 | |
| RU | 2374177 C1 | 11/2009 | |
| RU | 2682635 C1 | 3/2019 | |

OTHER PUBLICATIONS

International Search Report issued in corresponding International Application No. PCT/BR2020/050261 dated Aug. 25, 2020.
Ferreira, M.J. (2013), Universidade Federal de Santa Catarina, "Obtaining of sodium silicate by alkaline leaching from rice husk ash (rice husk ash) for use as a deflocculant," 85 pages. (English Abstract on p. 13).

* cited by examiner

*Primary Examiner* — Anthony J Zimmer
*Assistant Examiner* — Eric Scott Sherman
(74) *Attorney, Agent, or Firm* — ArentFox Schiff LLP

(57) ABSTRACT

A process of obtaining powdered sodium silicate from sand tailings generated from iron ore processing addresses the production of raw materials used in the manufacturing of geopolymers to be employed mainly by the construction industry and in road paving. The utilization of this tailing reduces environmental impact generated by the disposal in large dams, as well as enabling addition of value to a tailing by obtaining a commercially applicable product.

7 Claims, 4 Drawing Sheets

PROCESS OF OBTAINING POWDERED SODIUM SILICATE FROM SAND TAILINGS ORIGINATED FROM THE IRON ORE CONCENTRATION PROCESS

This application is a 35 U.S.C. § 371 National Phase of PCT Application No. PCT/BR2020/050261, filed Jul. 15, 2020, which claims priority to Brazilian Application No. BR102019018080-3, filed Aug. 30, 2019, the disclosures of which are hereby incorporated by reference herein.

FIELD OF THE INVENTION

The present invention refers to a process of producing powdered sodium silicate from sand tailings of mineral production, notably iron ore processing. The present invention mainly addresses the production of raw materials used in the manufacturing of geopolymers and alkali activated materials to be employed mainly by the construction industry and in road paving. The utilization of this tailing reduces the environmental impact generated by the disposal of tailings in large dams, as well as enabling addition of value to a tailing by obtaining a commercially applicable product.

PRIOR ART OF THE INVENTION

Sodium silicate is an inorganic compound with the general formula $Na_2O \cdot xSiO_2$ (where x is between 2.06 and 3.87), obtained by the combination of $SiO_2$ (silicon dioxide or silica) and $Na_2O$ (sodium oxide). It may be found both in aqueous solution and in solid form, being widely used in several applications, products, and industrial processes, in various industry sectors.

The sodium silicate family, also known as waterglass, features various compounds that contain sodium oxide ($Na_2O$) and silica ($SiO_2$), or a mixture of sodium silicates ranging their weighted ratios, solid content, density, and viscosity. These materials include a series of compounds that may be found in the form of sodium orthosilicate ($Na_4SiO_4$), sodium metasilicate ($Na_2SiO_3$), sodium polysilicate ($[Na_2SiO_3]_n$), sodium pyrosilicate ($Na_6Si_2O_7$), among others. Such compounds have glassy, colorless, and clear features, and are water-soluble, as well as being commercially available in the form of powder or viscous solutions. Some forms are soluble, and others are almost insoluble, and insoluble forms are easily dissolved by heating with pressurized water.

Sodium silicate is stable in neutral and alkaline solutions. In acid solutions, the silicate ion reacts with hydrogen ions to form silicic acid, which, when heated, forms silica gel, which is a hard and vitreous material.

The main applications for sodium silicate are as adhesive/binding agents, which are very important in several types of industries, such as paper, wood, metallic plates, glass, porcelain, optical applications, insulating materials, refractory cements, acid-proof and acid-resistant cements, briquettes, among others. Soluble silicates may also react with silicon fluoride or silica for producing acid-resistant cements with low contraction and thermal expansion similar to steel.

In mining, sodium silicate is applied due to its capacity of dispersion of clay, sand, quartz, fluorite, kaolin particles, among others, thus acting as an auxiliary component in the grinding phase. It is also widely used in the flotation process, as it acts as a modifying reagent, being employed as a depressant and dispersing reagent. It is emphasized its use in sulphide flotation. There are also references of its application in the remediation of acid drainages in mines, due to its basic characteristic, and as a zeolite synthesizer.

In construction industry, sodium silicate is used in the manufacturing of waterproof materials for walls, floors, and slabs. It is also used as an additive to accelerate cement curing and in the manufacturing of wall partitions and fire doors, due to its resistance to high temperatures. It is also used in the production of thermal insulators. It may also be applied in cosmetics and detergent industry.

As largely known by specialists in the art, the most common industrial methods used in the manufacturing of sodium silicate are:

- melting silica with sodium carbonate ($Na_2CO_3$) at 1300° C.;
- melting silica with sodium sulphate ($Na_2SO_4$) at 1300° C.;
- by water vapor in a strongly heated sand and sodium chloride mixture;
- in sodium hydroxide (NaOH) solutions, by the autoclave heating of silicon minerals (sand, chalcedony, opal, diatomite, etc.), at high temperature and pressure.

The production of sodium silicates by the reaction between sodium carbonate and silica (sand) is an energy-intensive process, due to the large energy expenditure for maintenance of high oven temperature.

The standard process for manufacturing sodium silicate consists of mixing silica ($SiO_2$) with sodium carbonate ($Na_2CO_3$) or, less frequently, with sodium sulphate ($Na_2SO_4$), with are melted in an oven at high temperature (1200° C. to 1500° C.) and pressure. A second process involves dissolution of silicate material (sand, chalcedony, opal, diatomite, etc.) in a sodium hydroxide solution (NaOH), also at high temperature and pressure, this last one being more common in Brazil.

The vitreous mixture is subjected to high pressure in an autoclave, with injection of vapor and water. A clear, slightly viscous, odorless, and fully soluble in water fluid is then formed. The solution, which is strongly alkaline, is stable in all usage and storage conditions. The solution may be dried to form hydrated sodium silicate crystals. The final properties of the produced silicate are dependent on the $SiO_2/Na_2O$ relation, which may be altered by the addition of NaOH during the process and may be summarized by the reaction:

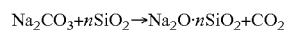

$$Na_2CO_3 + nSiO_2 \rightarrow Na_2O \cdot nSiO_2 + CO_2$$

Sodium silicate contains three components: silica, which is the primary constituent; alkali, represented by sodium oxide, and water, which grants the hydration characteristics.

Soluble sodium silicates are silicate polymers. The higher the polymerization degree, the higher the proportion of oxygen atoms shared by the tetrahedrons of $SiO_2$; therefore, the $SiO_2/Na_2O$ ratio is higher, which is called "silica module" and which varies between 1.6 to 3.75. Even if it is possible to produce silicates with modules higher than four, in practice, solubility would be very low. The $SiO_2/Na_2O$ ratio of the silicate, generally expressed in mass, determines physical and chemical properties of the product and its functional activity. The variation of this ratio allows multiple uses for sodium silicate. As the $SiO_2/Na_2O$ ratio increases, the viscosity increases and the pH of the solution decreases. With the increase in concentration, the solution increases in viscosity until it becomes a solid. For this reason, commercial solutions with a higher silica module are provided with lower total solid concentration.

The conventional manufacturing flowchart for sodium silicate, by melting and hydrothermal processes, is presented in FIG. 1, considering that in both processes a product with the same physical and chemical specifications is obtained.

According to the first process (a), the melting of carbonate and sand takes place in the oven at a temperature of 1.500° C. Afterwards, the product obtained from this melting (100% sodium silicate) is sent to the autoclave, and water is added. Under pressure, silicate is dissolved, and becomes a sodium silicate solution, which is filtered afterwards.

Chemical reactions that take place in the melting process (a) are:

$$Na_2CO_3 + xSiO_2 \rightarrow Na_2O \cdot xSiO_2 + CO_2$$

$$Na_2O \cdot xSiO_2 + nH_2O \rightarrow Na_2O \cdot xSiO_2 \cdot nH_2O$$

According to the hydrothermal process (b), caustic soda and sand are mixed and poured into the reactor, at high pressure and temperature, where the following reaction occurs:

$$2NaOH + xSiO_2 + (n-1)H_2O \rightarrow Na_2O \cdot xSiO_2 \cdot nH_2O$$

In the process using sodium carbonate, normally sodium hydroxide is added only to balance out the $Na_2O$ content in the final product. Filtration takes place to eliminate existing silica in the form of colloids.

In the search for varied alternative sources for production of sodium silicate, it is noted that a large amount of tailings is generated in iron ore extraction, arising out of the different ore processing phases, constituted of solid components, mainly sandy, similar to a very fine sand.

The advantage of mining tailings is that their chemical characteristics are very similar to ordinary sand, which increases their potential of use in substitution to sand ($SiO_2$).

These sandy residues, generated at an amount comparable to the concentrated iron ore material, are stored in dams or used for filling mining pits. Therefore, the availability of said residues, combined to its similarities with ordinary sand, have potential to render it as raw materials for several industrial segments, notably in manufacturing products for construction industry.

Concerns with tailings recycling have become the subject of research directed at reduction of negative environmental impacts associated to tailings. In Brazil, concerns about the considerable volume of tailings generated by the mining industry stand out. More specifically, for waste generated from iron ore processing, the importance of reutilization and added value has increased.

The potential of use of said tailings generates a positive environmental impact, when considering the possible benefits in face of the large amount of tailings produced during ore extraction, thus preventing its storage in dams, or even considerably reducing the size and volume of said facilities.

Other processes for obtaining sodium silicate have been investigated, in light of new raw materials as sources of silicate material. The state of the art comprises publications related to the production process of sodium silicate, according to the example below.

Document PI 0101413-7, filed on Mar. 6, 2001, presents the invention "Process of producing sodium silicate and/or sodium aluminate silica", created by Hélio José da Silva and Paolo Giuseppe Comini. It is disclosed a production process of sodium silicate from a low-cost raw material, processing waste, without energy input since the material itself is reactive. It basically consists in leaching of slag resulting from steel and metalworking processes (blast furnacing and steelworking) and an alkaline substance, such as, sodium hydroxide (NaOH), sodium carbonate ($Na_2CO_3$) or trona ($Na_2CO_3 \cdot NaHCO_3$). As opposed to what is presented in the process of the present invention, which involves heat treatment, i.e., thermal metallurgy, so that the sodium silicate formation reaction takes place, this document writes about a hydrometallurgy process to produce sodium silicate and/or sodium aluminate silica, which involves a leaching reaction with no need for energy input.

Ferreira, M. J. (2013), in his Master's thesis in Chemical Engineering of the post-graduation program of Universidade Federal de Santa Catarina, titled "Obtaining of sodium silicate by alkaline leaching from rice husk ash (rice husk ash) for use as a deflocculant", has used the ashes obtained from a rice husk combustion process, in obtaining sodium silicate. The process included the extraction of silica by alkaline leaching with sodium hydroxide, producing sodium silicate and residual rice husk ash. The extraction was carried out in concentrations of 1.5 and 3.0 N sodium hydroxide, at temperatures of 80 and 90° C. The reaction was evaluated at 1 and 2 hours for each concentration studied. Soluble silicates presented silica modules between 2.04 and 2.83. For this resulting silicate, density, viscosity and silica percentage were measured. Thus, experimentally produced sodium silicate was tested as a deflocculant for ceramic raw materials with a 0.40 percentage, compared to a 0.37% of commercial silicate. This process is distinct from the present invention, since it employs a hydrometallurgical (alkaline leaching) for obtaining sodium silicate, instead of a thermal metallurgy process.

U.S. Pat. No. 7,335,342, filed in Mar. 14, 2006, on behalf of the Council of Scientific and Industrial Research, titled "Process for the preparation of sodium silicate from kimberlite tailing", presents a process for the preparation of sodium silicate from kimberlite tailings generated as solid waste during diamond mining. The process comprises the reaction of kimberlite tailings in acidic means to remove soluble impurities, followed by digestion of kimberlite tailings with an alkaline solution in open or closed system, to obtain sodium silicate to be commercially employed.

This document presents an application for solid diamond mining tailings (kimberlite), whose typical composition is: $SiO_2$ 30-32%; $Al_2O_3$ 2-5%; $TiO_2$ 5-8%; CaO 8-10%; MgO 20-24%; $Fe_2O_3$ 5-11%; loss on ignition (PF) 15%.

The proposed route involves the use of kimberlite tailings as a source of silica to produce sodium silicate. Firstly, the tailings are subjected to a cleaning step, leaching with 18% w/v hydrochloric acid at a 1:4 ratio, at a temperature of 95-100° C., for 3 to 5 hours. After that period, the pulp is filtered and washed until it reaches neutral pH levels. It is subsequently subjected to digestion by caustic soda, where an 8% to 10% by weight NaOH solution is added to the material, at a solid-liquid ratio of 1:4, at a temperature of 95-190° C., in closed system, or at boiling temperature in an open system for 3 to 4 hours, obtaining sodium silicate with the required properties.

Differently than the proposition of the document, in the present invention, sodium silicate is obtained by the reaction of sodium hydroxide with the flotation tailings at temperatures in the order of 450° C. for 2.5 hours. Powdered sodium silicate ($Na_2SiO_3$) mixed with residual iron oxide of the tailings is obtained.

It should be also noted that the search for alternative materials regarding the Portland cement, with a production process that causes less environmental impact, has increased with research all over the world. Among said materials are geopolymers, which are cement binders with similar functions to Portland cement. Currently, geopolymers are experiencing an increase in interest, since their manufacturing process emits only a fifth of the amount of carbon dioxide gas emitted for manufacturing Portland cement. The Portland cement industry, within the industrial sector, is the second largest emitter of carbon dioxide gas. These binders are obtained by alkaline activation of materials rich in silica and alumina, with highlights to metakaolin and industrial residues. It requires addition of silica in the form of sodium (or potassium) silicates to metakaolin to increase the amount of silica in the obtaining of geopolymers.

Geopolymers are inorganic polymers with increased resistance, obtained from a solid reactive mineral containing silicon and aluminum oxide which receive a basic activation solution with alkaline hydroxides or silicates.

Geopolymers are products with numerous applications in construction industry as replacement for cement, as well as promoting reductions in $CO_2$ emissions. Its use in paving is very positive, as it considerably reduces the frequency of corrective maintenance, due to the lack of cracks and heat melting, which also implies in reducing paving and road maintenance costs.

The present invention further presents an alternative to geopolymer production, where the sand tailings originated from iron ore concentration process are used as aggregate together with sodium silicate produced from the same tailings. Obtaining geopolymers from said tailings is seen as an alternative for decreasing tailings storage areas and to the elimination of dams.

OBJECTIVES OF THE INVENTION

The present invention has as its overall objective to provide a process for obtaining sodium silicate from sand tailings from the iron ore concentration process, as a source of silica, for using in manufacturing geopolymers.

Additional objectives of the present invention are to decrease tailings in iron ore processing units, which adds up to major environmental impact, and the utilization of this tailing, transforming it into a commercial product.

Another objective of the present invention is, therefore, to reduce the environmental impact generated by the disposal of ore processing tailings in dams, which is possible by harnessing this material as a source of silicate material to produce sodium silicate.

SUMMARY OF THE INVENTION

The present invention, in its preferential embodiment, discloses a process for obtaining powdered sodium silicate from sand tailings generated from the iron ore concentration process, comprising the following steps:
a) removing the ultra-fine fraction (grain size lower than 40 μm), also called slurry, present in sandy tailings generated from the iron ore concentration process;
b) subjecting the slurry-free material to removal of excess humidity;
c) drying the resulting material after removal of excess humidity;
d) adding a sodium hydroxide solution to the dried material, at a concentration of 33 to 38 mol/L, at a ratio of one part of tailing mass for two parts of solution mass;
e) subjecting the tailing and the sodium hydroxide solution to mixing in proper equipment, ensuring perfect homogenization;
f) subjecting the mixture to heat treatment at a temperature between 400° C. and 500° C. and, afterwards, cooling the obtained material; and
g) storing the cooled material, as the final product, thus preventing absorption of humidity due to its hygroscopic behavior.

BRIEF DESCRIPTION OF THE DRAWINGS

The present invention is described in detail based on the following drawings.

DETAILED DESCRIPTION OF THE INVENTION

Figure 1:
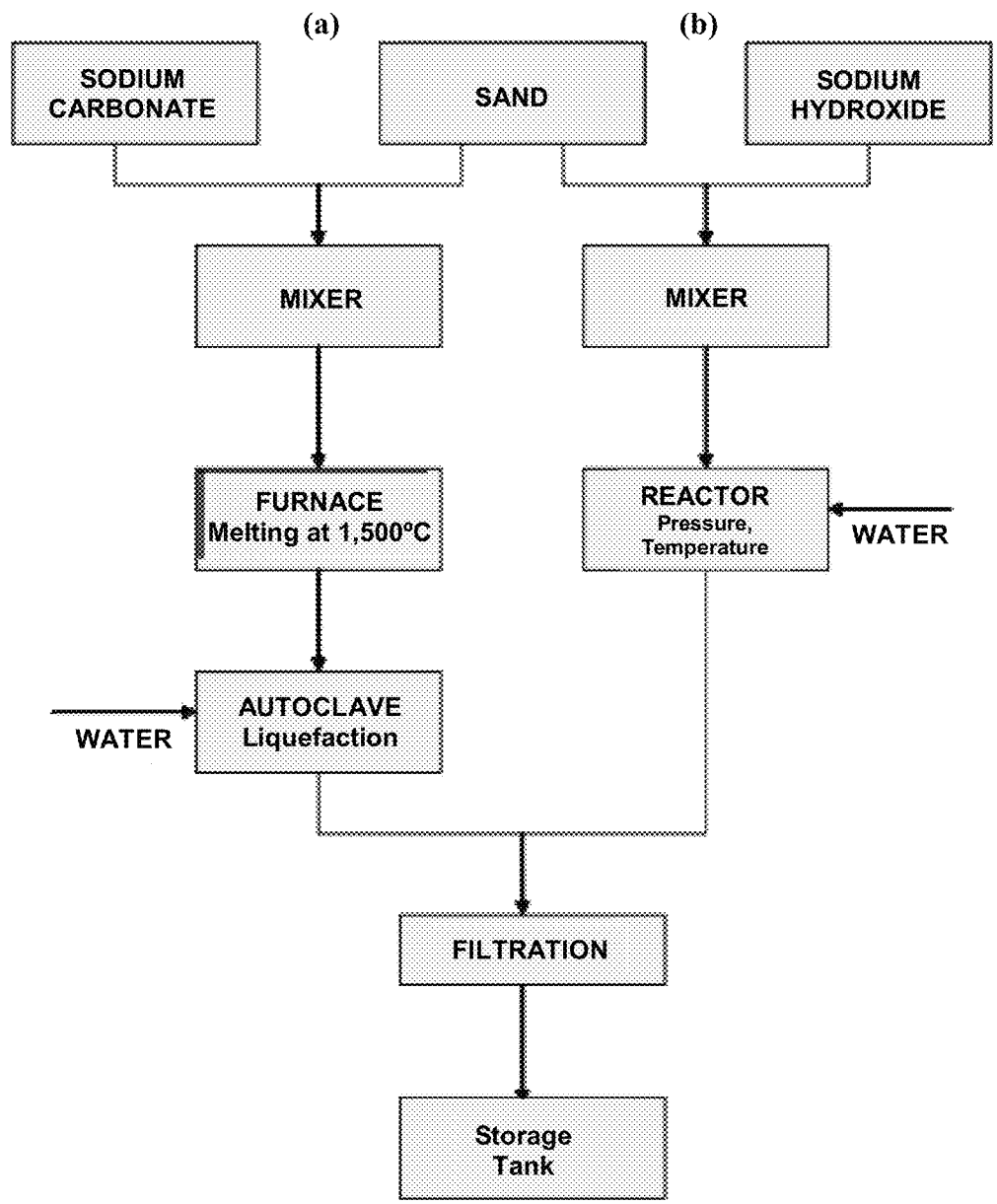
FIG. 1 illustrates a simplified block diagram of the sodium silicate production from the melting process (a) or hydrothermal process (b)
Figure 2:
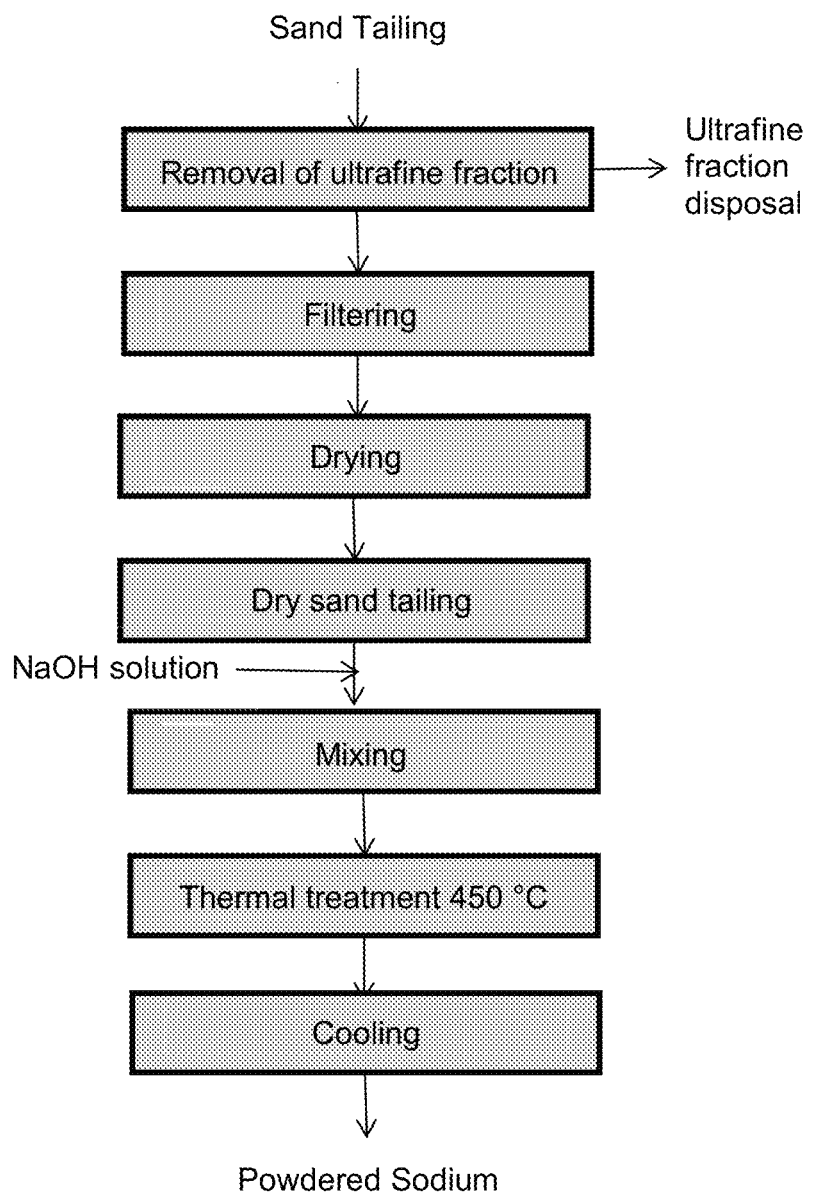
FIG. 2 presents a simplified block diagram of the production process of powdered sodium silicate from sand tailings generated by the iron ore concentration process, as per the present invention.

Although the present invention may be sensitive to different models, the drawings and the following detailed discussion portrait the preferred embodiments in understanding that the present description must be considered an example of the invention principles and does not intend to limit the present invention to the provisions herein.

The claimed subject matter of the present invention shall be detailed below, as a non-limiting example, since materials and methods disclosed herein may comprise different details and procedures, without deviation from the scope of the invention. Unless stated otherwise, all parts and percentages described as follows are weight measurements.

The main approach of this invention is related to a process for production of sodium silicate from materials with high silica ($SiO_2$) contents in their constitution, said materials being flotation tailings, generated by the iron ore concentration process.

In a preferred embodiment, the production process of sodium silicate of the present invention uses sand tailings generated from the iron ore concentration process by flotation as source of silica-containing materials, which has characteristics similar to ordinary sand and may be used in this production process, in replacement of sand as a silica source.

In another preferred embodiment, the production process of sodium silicate of the present invention comprises the following steps:
a) removing the ultra-fine fraction (grain size lower than 40 μm), also called slurry, present in sandy tailings generated from the iron ore concentration process;
b) subjecting the slurry-free material to removal of excess humidity;
c) drying the resulting material after removal of excess humidity;
d) adding a sodium hydroxide solution to the dried material, at a concentration of 33 to 38 mol/L, at a ratio of one part of tailing mass for two parts of solution mass;
e) subjecting the tailing and the sodium hydroxide solution to mixing in proper equipment, ensuring perfect homogenization;
f) subjecting the mixture to heat treatment at a temperature between 400° C. and 500° C. and, afterwards, cooling the obtained material; and g) storing the cooled material, as the final product, thus preventing absorption of humidity due to its hygroscopic behavior.

The process starts with the removal of ultra-fine material (grain size lower than 40 μm), also called slurry, present in the sand tailings, which may be carried out by a cyclone system, thickening, or centrifugation or, more adequately, a combination of said unit operations, resulting in a material with suitable grain size to the subsequent processing.

After removal of the ultra-fine fraction, the slurry-free material, with a solid percentage ranging between 20 and 65% (by mass), is sent to a dewatering step, which may be carried out by filtering or centrifugation, preparing the material for the next step of drying. The objective of filtering is to minimize material humidity, which leads to less energy consumption. The humidity of the obtained cake is also related, in addition to the presence of fine material, to minerals present in the composition. This unit operation preferably yields a cake with up to 15% by mass humidity, and this value is not limiting.

Therefore, the following drying step is important to ensure the removal of excess humidity of the material. This process may be carried out in several ways, however, the most common ones for solid materials are based on heat exchanging and, in the case of the present invention, it may preferably be by a direct (convection) or indirect (conduction) method. Drying is carried out in a standard dryer, being a rotation-type or fluid bed dryer, for example. The drying temperature used in the industry, particularly when referring to materials with no oxidization issues, is up to 105° C., but it may be defined according to the equipment type to be used, as well as the time required. Depending on weather conditions and storage availability, drying may also be performed outdoors.

After drying, the dry material receives a sodium hydroxide solution at a concentration of 33 to 38 gmol/L, at a mass ration of one part of dry material for two parts of solution, to obtain a paste. A blender is used to ensure efficient mixing with material homogeneity. The mixing is performed constantly for about 2 minutes, with no heat loss.

The mixture obtained is sent to a heat step, in which a rotating furnace may be used at a process temperature of between 400° C. and 500° C. The mixture heating may be carried out at an average heating rate of 10° C./min, with a non-limiting preferred residence time of 2.5 hours. After heat treatment, the material is subjected to a cooling phase in a heat exchanger, which may be of shell and tube type. After cooling, the temperature of the powdered sodium silicate, i.e., final product of the present invention, must be in the range of 60° C. and 75° C. This product must be stored in a closed location or container, to prevent absorption of humidity due to its high hygroscopicity.

Example

Test bench scale tests were performed with iron ore processing tailing samples, aiming at the production of powdered sodium silicate. The obtained results show the possibility of obtaining sodium silicate suitable to use in producing geopolymers.

In said tests, two flotation tailings from an iron ore concentration unit were used, identified as VGR1 and VGR2. The chemical composition of the samples is presented in Table 1.

TABLE 1

Average chemical composition of iron ore flotation tailing samples (Technique: X-ray Fluorescence)

| (%) | Average composition of flotation tailings | |
| --- | --- | --- |
|  | VGR1 | VGR22 |
| Fe | 26.68 | 20.85 |
| $SiO_2$ | 59.78 | 68.36 |
| $Al_2O_3$ | 1.03 | 0.37 |
| P | 0.028 | 0.013 |
| Mn | 0.029 | 0.015 |
| CaO | 0.011 | 0.010 |
| MgO | 0.027 | 0.023 |
| $TiO_2$ | 0.102 | 0.018 |

The tailings pulp was decanted at first, separating the supernatant, which included the ultra-fine fraction smaller than 40 μm, by siphoning. The decanted and thickened material was subjected to stove drying for 24 h, at a temperature of 100° C. After drying, the material was disaggregated and homogenized.

In the sodium silicate preparation sequence, the dried and homogenized material received a NaOH solution at a concentration of 37 gmol/L, at a 1:2 dried material/solution by mass ratio.

The mixture was taken to a furnace and heated at a rate of 10° C./min up to 450° C., said temperature being maintained for 2.5 hours. The product of this heat treatment is sodium silicate, obtained in powder form. After this step, the product was cooled at room temperature and stored in a closed container, to prevent water absorption from the environment due to its hygroscopic behavior.

Figure 4:
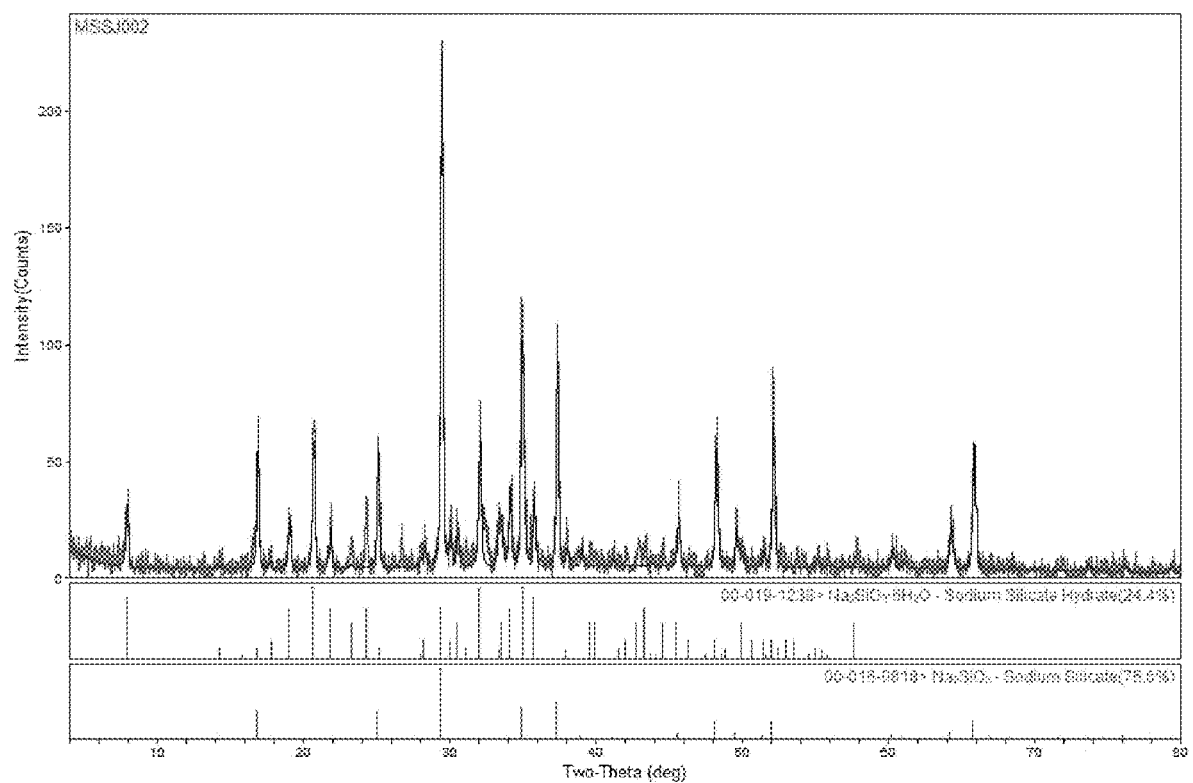
FIG. 4 illustrates an X-ray diffractogram of the obtained sodium silicate.

For purposes of characterization of the powdered sodium silicate, X-ray Diffraction and X-ray Fluorescence procedures were carried out. The diffraction diagram is shown in FIG. 4.

Table 2 presents the chemical composition of the obtained powdered sodium silicate. It should be noted that the $SiO_2$/$Na_2O$ ratio is lower than 1, unlike the commercial silicates, whose ratio ranges between 1.60 and 3.75. The excess amount of $Na_2O$ is a key feature of this product, since water addition to obtain the binding paste provides the alkaline medium required for dissolution of aluminate and silicate ions from metakaolin or other sources of said ions, in order to form the geopolymer.

TABLE 2

Chemical composition of samples obtained from sodium silicate from sand tailings (Technique: X-ray Fluorescence)

| Oxides | Samples obtained from Powdered Sodium Silicate | |
| --- | --- | --- |
| (%) | SS1 | SS2 |
| $Na_2O$ | 47.34 | 47.80 |
| $SiO_2$ | 37.72 | 37.71 |
| $Fe_2O_3$ | 13.33 | 13.32 |
| $SO_3$ | 0.89 | 0.66 |
| $P_2O_5$ | 0.31 | 0.36 |
| CaO | 0.10 | 0.10 |
| $Cr_2O_3$ | 0.08 | 0.08 |
| $Sc_2O_3$ | 0.06 | ND* |

*ND: not detected

Figure 3:
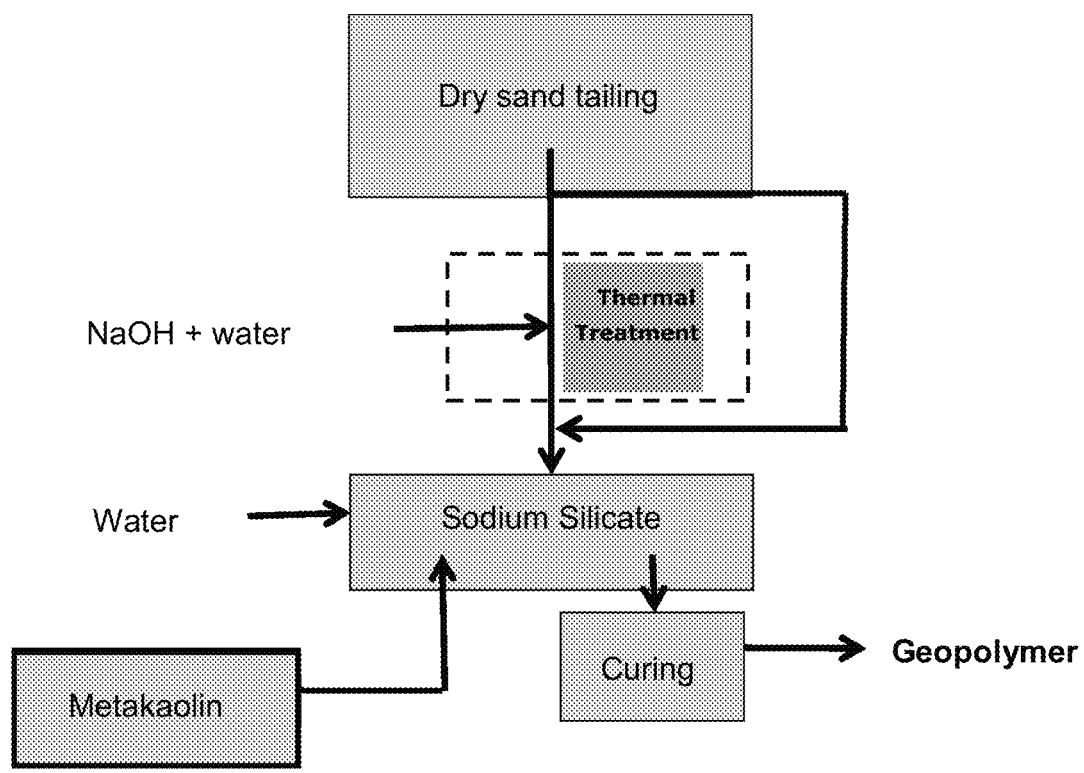
FIG. 3 presents a process for obtaining geopolymers using sodium silicate obtained from sand tailings.

Powdered sodium silicate ($Na_2SiO_3$), obtained from the process described by the present invention, generated from sand tailings from the iron ore concentration process, may be used in producing geopolymers, which have application in road paving, for example, in which the obtaining process is shown in the block diagram of FIG. 3.

Powdered sodium silicate obtained through the presented technique, according to FIG. 3, may be mixed with metakaolin or other source of amorphous powdered aluminum-silicate, together with the flotation tailing. Afterwards, water is added to this mixture, producing a paste that is molded to obtain hardened monoliths. This material may be used to replace Portland cement mortar, with the added benefit of including a high fraction of tailings, which is not possible with this kind of cement. The geopolymer obtained may be used in construction industry or in sidewalk or road paving works. Obtaining this geopolymer from alternative silica-containing sources has been the subject of research and its use has the added benefit of avoiding handling highly alkaline solutions, in addition to featuring a process that is very similar to producing Portland cement mortar.

Therefore, although only a few embodiments of the present invention were shown, it is understood that several omissions, substitutions, and amendments may be carried out by a person skilled in the art, without deviation from the essence and scope of the present invention. The embodiments described herein must be considered on all aspects only as illustrative and non-restrictive.

It is expressly stated that all combinations of elements that carry out the same function, substantially in the same manner and to achieve the same results, are within the scope of the invention. Replacing elements of a described embodiment to another are also fully intended and considered.

It must also be understood that the drawings are not necessarily in scale but only conceptual in nature. The intent, therefore, is to be limited to the provisions of the scope of the attached claims.

The invention claimed is:

1. A process of obtaining powdered sodium silicate from sand tailings generated from iron ore concentration process comprising the following steps:

a) removing the ultra-fine fraction, with grain size lower than 40 μm, present in sandy tailings generated from the iron ore concentration process;
    b) subjecting the material without ultra-fine fraction to removal of excess humidity;
    c) drying the resulting material after removal of excess humidity;
    d) adding a sodium hydroxide solution to the dried material, at a concentration of 33 to 38 mol/L, at a ratio of one part of tailing mass for two parts of solution mass;
    e) subjecting the tailing and the sodium hydroxide solution to mixing until perfect homogenization;
    f) subjecting the mixture to heat treatment at a temperature between 400° C. and 500° C. and, afterwards, cooling the obtained material; and
    g) storing the cooled material, as the final product, thus preventing absorption of humidity.

2. The process according to claim 1, wherein the material without ultra-fine fraction resulting from step a) presents a solid percentage ranging from 20 to 65% by mass.

3. The process according to claim 1, wherein the removal of ultra-fine fraction in step a) is carried out by cyclone system, thickening, centrifugation, or a combination these unit operations.

4. The process according to claim 1, wherein the removal of excess humidity in step b) is carried out by filtering or centrifugation.

5. The process according to claim 1, wherein the product of removal of excess humidity in step b) has up to 15% by mass humidity.

6. The process according to claim 1, wherein the drying performed in step c) is carried out in a standard dryer, including a rotation-type dryer or a fluid bed dryer.

7. The process according to claim 1, wherein the temperature of the final product after cooling in step f) is in the range of between 6° and 75° C.

* * * * *